(12) United States Patent
Sarcone

(10) Patent No.: US 9,152,825 B2
(45) Date of Patent: Oct. 6, 2015

(54) USING STORAGE CONTROLLER BUS INTERFACES TO SECURE DATA TRANSFER BETWEEN STORAGE DEVICES AND HOSTS

(75) Inventor: Christopher J. Sarcone, San Jose, CA (US)

(73) Assignee: Apple Inc., Cupertino, CA (US)

( * ) Notice: Subject to any disclaimer, the term of this patent is extended or adjusted under 35 U.S.C. 154(b) by 512 days.

(21) Appl. No.: 13/408,725

(22) Filed: Feb. 29, 2012

(65) Prior Publication Data

US 2013/0227301 A1     Aug. 29, 2013

(51) Int. Cl.
    *H04L 15/16*     (2006.01)
    *G06F 21/85*     (2013.01)

(52) U.S. Cl.
    CPC ...................................... *G06F 21/85* (2013.01)

(58) Field of Classification Search
    CPC ................................ H04L 9/06; H04W 12/00
    USPC ................... 713/168, 189, 193; 380/277, 278
    See application file for complete search history.

(56) References Cited

U.S. PATENT DOCUMENTS

| | | | | |
|---|---|---|---|---|
| 7,849,330 | B2 * | 12/2010 | Osaki ............................ | 713/193 |
| 8,190,784 | B1 * | 5/2012 | Raizen et al. ..................... | 710/5 |
| 8,635,441 | B2 * | 1/2014 | Frenkel et al. ................ | 713/153 |
| 2004/0025040 | A1 * | 2/2004 | Aoki et al. ..................... | 713/193 |
| 2006/0242429 | A1 | 10/2006 | Holtzman | |
| 2008/0163356 | A1 * | 7/2008 | Won-Jip et al. .................. | 726/13 |
| 2008/0209203 | A1 | 8/2008 | Haneda | |
| 2012/0036347 | A1 * | 2/2012 | Swanson et al. .................. | 713/2 |

FOREIGN PATENT DOCUMENTS

EP     1 953 669 A2     8/2008

OTHER PUBLICATIONS

"Cipher Instruction Search Attack on the Bus-Encryption Security Microcontroller DS5002FP"—Markus G. Kuhn, IEEE, Oct. 1998 http://www3.informatik.uni-erlangen.de/Publications/Articles/kuhn_ToC.pdf.*

PCT International Search Report and The Written Opinion of the International Searching Authority mailed Jun. 7, 2013 for PCT/US2013/028053, filed Feb. 27, 2013, 8 pages.

PCT International Preliminary Report on Patentability mailed Sep. 12, 2014 for PCT/US2013/028053.

* cited by examiner

*Primary Examiner* — Randy Scott
(74) *Attorney, Agent, or Firm* — Blakely, Sokoloff, Taylor & Zafman LLP

(57) ABSTRACT

The disclosed embodiments provide a system that secures data transfer between a storage device and a host. During operation, the system obtains an input/output (I/O) command and an encryption context associated with the I/O command from a device driver executing on the host. Next, the system uses a storage controller bus interface between the host and the storage device to apply the encryption context to data associated with the I/O command, wherein the encryption context enables transmission of an encrypted form of the data between the storage device and the host. Finally, the system uses the storage controller bus interface to issue the I/O command to the storage device, wherein the I/O command is processed by the storage device.

25 Claims, 5 Drawing Sheets

| | | | |
|---|---|---|---|
| DW0 | 302<br>Block Size | 304<br>Reserved | 306<br>En |
| DW1 | 308 Block Count | | |
| DW2 | 310 IV Table Address | | |
| DW3 | 312 IV Table Address Upper | | |
| DW4 | 314<br>Key 1 | | |
| DW5 | | | |
| DW6 | | | |
| DW7 | | | |
| DW8 | 316<br>Key 2 | | |
| DW9 | | | |
| DW10 | | | |
| DW11 | | | |
| DW12 | 318<br>Initial Vector | | |
| DW13 | | | |
| DW14 | | | |
| DW15 | | | |

FIG. 3

USING STORAGE CONTROLLER BUS INTERFACES TO SECURE DATA TRANSFER BETWEEN STORAGE DEVICES AND HOSTS

BACKGROUND

1. Field

The present embodiments relate to storage devices for computer systems. More specifically, the present embodiments relate to techniques for using storage controller bus interfaces to encrypt and decrypt data transferred between storage devices and hosts connected to the storage devices.

2. Related Art

A modern computer system typically includes a motherboard containing a processor and memory, along with a set of peripheral components connected to the motherboard via a variety of interfaces. For example, a Serial Advanced Technology Attachment (SATA) interface may facilitate data transfer between a storage device (e.g., hard disk drive (HDD), optical drive, solid-state drive (SSD), hybrid hard drive (HHD), etc.) and the motherboard, while a Peripheral Component Interconnect Express (PCIe) bus may enable communication between the motherboard and a number of integrated and/or add-on peripheral components.

Such data transfer within a computer system may be associated with a number of security issues and/or disadvantages. In particular, a storage device that stores and/or transmits data in unencrypted plaintext form may be vulnerable to unauthorized access by an eavesdropper and/or attacker. For example, the confidentiality of unencrypted data on an HDD may be compromised while the data is at rest in the storage device and/or in transit across the interface (e.g., SATA interface) between the HDD and the computer system's motherboard. On the other hand, data that is encrypted by the HDD prior to storage may be protected while at rest, but may also be unencrypted prior to transmission between the HDD and the motherboard and thus vulnerable to unauthorized access outside the HDD.

To further secure the data, a Central-Processing Unit (CPU) on the motherboard may encrypt the data prior to transmitting the data over an interface with the storage device. As a result, the confidentiality of the data may be maintained both while the data is at rest and during transmission of the data over the interface. However, CPU-based encryption of stored data may require the CPU to sequentially retrieve the data, copy the data, encrypt the copied data, and then transmit the data to the storage device, thus increasing the computational overhead and/or power consumption of the computer system.

Hence, what is needed is a mechanism for reducing the power consumption and/or computational overhead associated with securing data storage and transfer in computer systems.

SUMMARY

The disclosed embodiments provide a system that secures data transfer between a storage device and a host. During operation, the system obtains an input/output (I/O) command and an encryption context associated with the I/O command from a device driver executing on the host. Next, the system uses a storage controller bus interface between the host and the storage device to apply the encryption context to data associated with the I/O command, wherein the encryption context enables transmission of an encrypted form of the data between the storage device and the host. Finally, the system uses the storage controller bus interface to issue the I/O command to the storage device, wherein the I/O command is processed by the storage device.

In some embodiments, after the I/O command is completed by the storage device, the system also notifies the device driver of the completed I/O command.

In some embodiments, obtaining the I/O command and the encryption context from the host involves:
(i) obtaining a set of memory addresses associated with the I/O command and the encryption context from the device driver; and
(ii) using direct memory access (DMA) to transfer the I/O command and the encryption context from the memory addresses on the host to a buffer on the storage controller bus interface.

In some embodiments, the system processes the I/O command based on the type of the I/O command. If the I/O command corresponds to a write command, the system uses the encryption context to encrypt the data prior to issuing the I/O command to the storage device. If the I/O command corresponds to a read command, the system uses the encryption context to decrypt the data after the I/O command is processed by the storage device.

In some embodiments, if the I/O command corresponds to the read command, the system also transfers the decrypted data to a set of memory addresses on the host (e.g., using DMA) prior to notifying the device driver of the completed I/O command.

In some embodiments, the encryption context is associated with at least one of an application, a file, and a user. In other words, the encryption context may enable the encryption of data in the host at different encryption granularities, thus providing more flexibility in securing data than conventional block-based encryption and decryption on storage devices.

In some embodiments, the encryption context includes one or more keys and an initial vector. For example, the keys and/or initial vector may be used to perform AES-XTS encryption of the data.

BRIEF DESCRIPTION OF THE FIGURES

FIG. 3 shows an exemplary encryption context in accordance with the disclosed embodiments.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
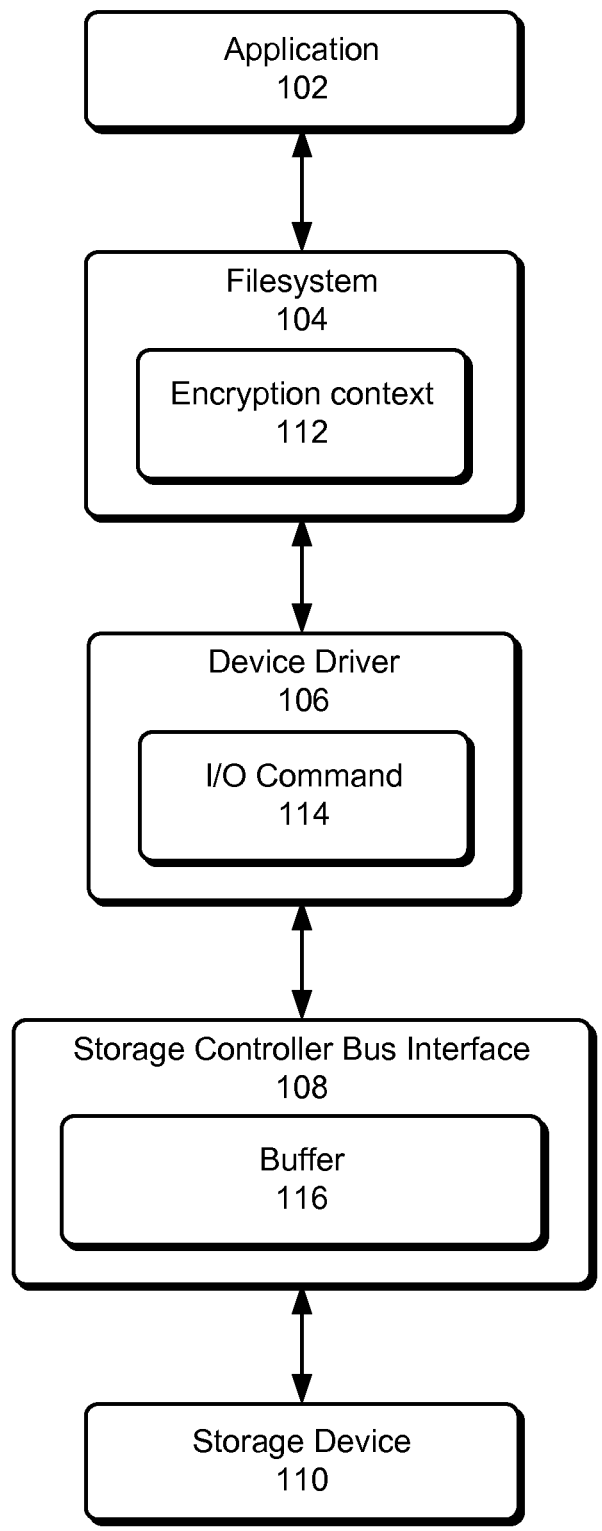
FIG. 1 shows a schematic of a system in accordance with the disclosed embodiments.

The disclosed embodiments provide a method and system for transferring data within a computer system. As shown in FIG. 1, the computer system may include a storage device 110 such as a hard disk drive (HDD), a solid-state drive (SSD), and/or a hybrid hard drive (HHD) connected to a processor (e.g., Central-Processing Unit (CPU)) and/or memory in the computer system through a storage controller bus interface 108 such as a Serial ATA (SATA) interface.

Storage device 110 may store data for an application 102 and/or a filesystem 104 executing on the processor. To access and/or modify the data, application 102 may make a system call for one or more files to filesystem 104, and filesystem 104 may issue an input/output (I/O) request corresponding to the system call to a device driver 106 for storage device 110. Next, device driver 106 may build an I/O command 114 containing a logical block address (LBA), number of blocks, and/or other information related to the requested file(s) and transmit I/O command 114 over storage controller bus interface 108 to storage device 110. Storage device 110 may then process I/O command 114 by reading from and/or writing to the blocks specified in I/O command 114.

Those skilled in the art will appreciate that unencrypted data on the computer system may be vulnerable to unauthorized access while the data is at rest on storage device 110 and/or being transmitted over storage controller bus interface 108. To mitigate such vulnerability, the data may be encrypted by storage device 110 and/or a process executing on a CPU of the computer system. For example, a controller for storage device 110 may secure data on storage device 110 by encrypting the data using the 128-bit Advanced Encryption Standard (AES).

However, encryption of data by the CPU and/or storage device 110 may be associated with a number of disadvantages. First, data that is encrypted by storage device 110 may be unencrypted for transmission over storage controller bus interface 108 and thus vulnerable to snooping by an attacker. On the other hand, data encryption by the CPU prior to transmission over storage controller bus interface 108 to storage device 110 may prevent unauthorized access to the data during both storage and transmission of the data but may also increase the computational overhead and/or power consumption of the computer system. For example, the CPU may secure data during a write to storage device 110 by copying the data from a first buffer to a second buffer, encrypting the data in the second buffer, and then transferring the data to storage device 110. The additional CPU cycles associated with copying and encrypting the data may result in a corresponding increase in the latency of the write, as well as the amount of power consumed by the CPU in performing the write.

In one or more embodiments, the system of FIG. 1 reduces power consumption and/or latency associated with CPU-based encryption of data on storage device 110 by performing the encryption on storage controller bus interface 108. As described above, application 102 and/or another component of the computer system may read and/or write data on storage device 110 by making a system call to filesystem 104.

Next, filesystem 104 may provide an encryption context 112 for the system call to device driver 106. In one or more embodiments, encryption context 112 enables transmission of an encrypted form of the data between storage device 110 and the computer system. For example, encryption context 112 may include one or more keys and an initial vector for use with AES-XTS encryption of the data. Encryption context 112 may then be used to encrypt data on the computer system prior to transmitting the data to storage device 110 and decrypt data on the computer system after the data is received from storage device 110. Encryption contexts are discussed in further detail below with respect to FIG. 3.

In one or more embodiments, filesystem 104 includes functionality to manage the encryption and decryption of data at different encryption granularities. For example, filesystem 104 may maintain a set of encryption contexts, including encryption context 112, for use in encrypting and decrypting data on storage device 110. Filesystem 104 may also assign the keys and/or initial vector from each encryption to an application, a file, and/or a user. Data associated with the application, file, and/or user may then be encrypted and decrypted using the corresponding encryption context. In other words, filesystem 104 may provide more flexibility in securing data on the computer system than a storage device (e.g., storage device 110) and/or controller that performs block-based encryption and decryption of data.

Once encryption context 112 is available, device driver 106 may place encryption context 112 into memory on the computer system and provide a memory address for encryption context 112 to storage controller bus interface 108. Device driver 106 may also build I/O command 114 in memory based on the system call and provide a memory address for I/O command 114 to storage controller bus interface 108. Storage controller bus interface 108 may then use direct memory access (DMA) to transfer I/O command 114 and encryption context 112 from the memory addresses on the computer system to a buffer 116. Once I/O command 114 and encryption context 112 are in buffer 116, storage controller bus interface 108 may apply encryption context 112 to data associated with I/O command 114 and issue I/O command 114 to storage device 110 for processing by storage device 110, as discussed in further detail below with respect to FIG. 2.

Figure 2:
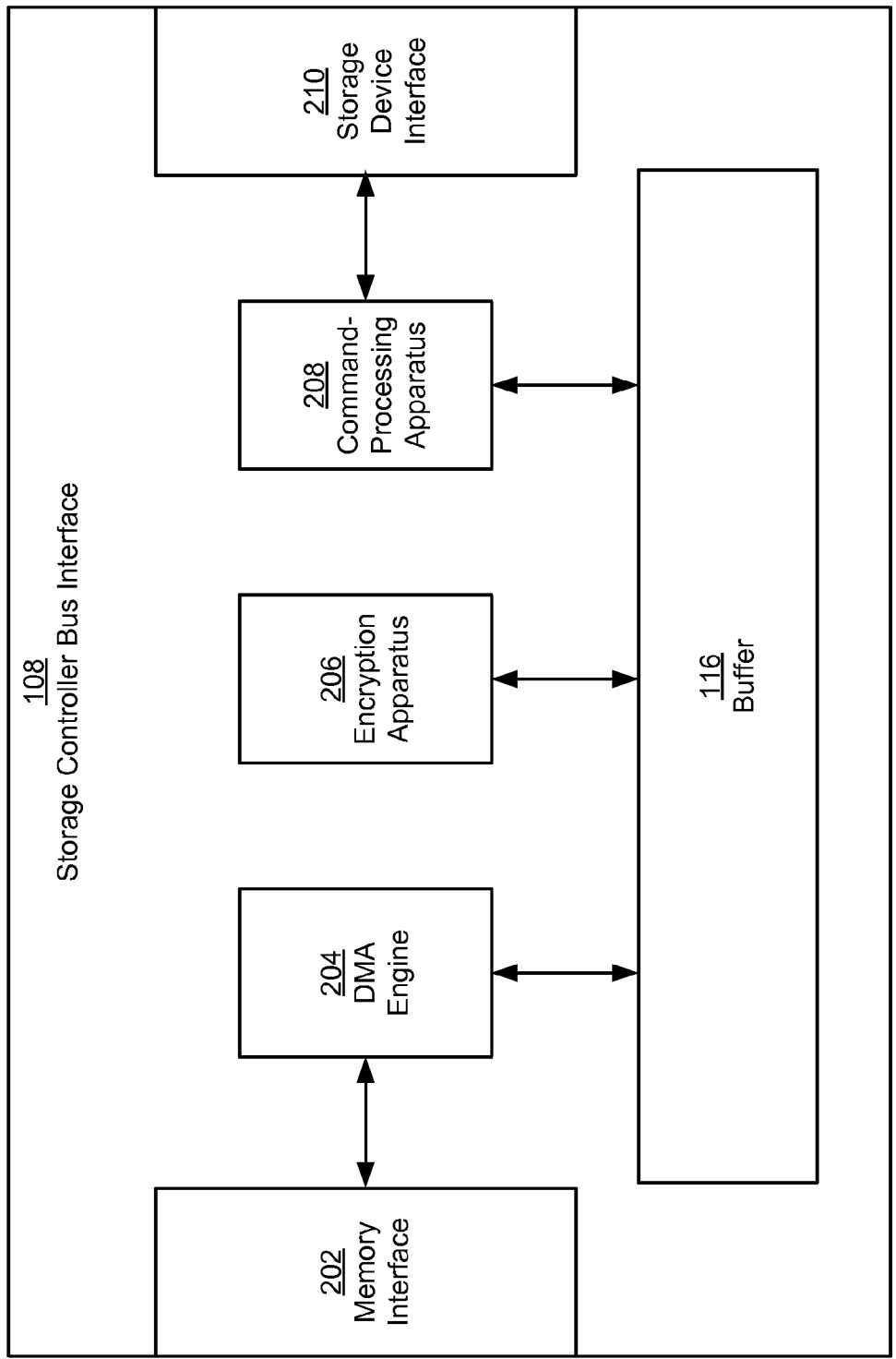
FIG. 2 shows a storage controller bus interface in accordance with the disclosed embodiments.

FIG. 2 shows storage controller bus interface 108 in accordance with the disclosed embodiments. As described above, storage controller bus interface 108 may be used to transmit data between a storage device (e.g., storage device 110 of FIG. 1) and a host (e.g., computer system). For example, storage controller bus interface 108 may correspond to an Advanced Host Controller Interface (AHCI) controller (e.g., host bust adapter) that connects a SATA HDD to a motherboard containing a CPU and memory on the host. Alternatively, storage controller bus interface 108 may be implemented by an integrated NAND controller for an SSD that connects a set of NAND chips on the SSD to the motherboard.

Moreover, storage controller bus interface 108 may prevent unauthorized access to the data by enabling both the storage and transmission of an encrypted form of the data between the storage device and the host. First, storage controller bus interface 108 may use a memory interface 202 such as a Peripheral Component Interconnect Express (PCIe) interface and a DMA engine 204 to obtain an I/O command (e.g., I/O command 114 of FIG. 1) and an encryption context (e.g., encryption context 112 of FIG. 1) associated with the I/O command from a device driver (e.g., device driver 106 of FIG. 1) executing on the host. For example, the device driver may provide a set of memory addresses associated with the I/O command and the encryption context to storage controller bus interface 108, and DMA engine 204 may use memory interface 202 to transfer the I/O command, associated data, and/or encryption context from the memory addresses on the host to buffer 116 without directly accessing the CPU of the host.

To protect the data, an encryption apparatus 206 in storage controller bus interface 108 may apply the encryption context to the data, thus enabling transmission of an encrypted form of the data between the storage device and the host. For example, encryption apparatus 206 may include a set of encryption engines operating in parallel, with each encryption engine performing AES-XTS encryption on a portion of the data using a set of keys and an initial vector from the encryption context.

A command-processing apparatus 208 in storage controller bus interface 108 may also process the I/O command and issue the I/O command over a storage device interface 210 (e.g., SATA interface) with the storage device for processing by the storage device. For example, if the I/O command corresponds to a write command, encryption apparatus 206 may use the encryption context to encrypt the data before command-processing apparatus 208 issues the I/O command to the storage device. If the I/O command corresponds to a read command, encryption apparatus 206 may use the encryption context to decrypt the data after the I/O command is processed by the storage device and the data is received over storage device interface 210. Storage controller bus interface 108 may then transfer the decrypted data to a set of memory addresses on the host (e.g., using memory interface 202 and DMA engine 204) for use by the application and/or component requesting the data.

Operation of storage controller bus interface 108 may further be facilitated by setting the minimum block size for reads and writes to memory (e.g., through memory interface 202) to the block size used to encrypt and decrypt the data transmitted over storage device interface 210. For example, the storage device may correspond to an SSD with a page size of 4 KB. Each page may thus correspond to the smallest unit of data transferred between the storage device and storage controller bus interface 108. In turn, the minimum block size of I/Os over memory interface 202 may also be set to 4 KB to simplify encryption and decryption of the data (e.g., by allowing encryption apparatus 206 to encrypt and decrypt only full pages).

After the I/O command is completed by the storage device, storage controller bus interface 108 may notify the device driver of the completed I/O command. For example, storage controller bus interface 108 may transmit a notification of the completed I/O command to the device driver through memory interface 202. Storage controller bus interface 108 may then obtain a new I/O command and encryption context from the device driver and process the new I/O command in the manner described above until all outstanding I/O commands to the storage device have been completed.

Because encryption and decryption of data on the storage device is provided by storage controller bus interface 108, the data may be secured against unauthorized access both while the data is at rest on the storage device and during transmission of the data between the storage device and the host (e.g., over storage controller bus interface 108). In addition, storage controller bus interface 108 may reduce the performance overhead and/or power consumption associated with CPU-based encryption of the data. For example, a CPU may perform a write to the storage device by sequentially creating a write command, copying data associated with the write command, performing encryption on the copy, and then transmitting the write command and encrypted data to the storage device. On the other hand, storage controller bus interface 108 may encrypt data associated with a write command without copying the data and/or while other I/O commands are being created, transmitted, and/or processed by the CPU and/or storage device. Similarly, the offloading of data encryption from the CPU to storage controller bus interface 108 may reduce the power consumption associated with the encryption from more than 10 W to less than 3 W.

FIG. 3 shows an exemplary encryption context in accordance with the disclosed embodiments. The encryption context may be stored in an encryption context table with other encryption contexts, and entries in the encryption context table may be matched to I/O commands in a Command List (e.g., AHCI Command List) for a storage controller bus interface, such as storage controller bus interface 108 of FIG. 1. For example, an encryption context in the encryption context table may share an index with the corresponding I/O command in the Command List. The encryption context and I/O command may then be retrieved by providing the index to both the encryption context table and Command List.

As shown in FIG. 3, the encryption context may be composed of 16 32-bit data words. The first data word (e.g., "DW0") may contain a block size 302, a set of reserved bits 304, and an enable bit 306. Block size 302 may specify the length of each block to be encrypted and may be expressed as a $2^x$ multiplier of 4096 bytes. For example, a value of 0 for block size 302 may indicate that each block is 4096 bytes long, a value of 1 may indicate that each block is 8192 bytes long, and a value of 2 may indicate that each block is 16384 bytes long. In the second half of the first data word, reserved bits 304 may be cleared to 0, and enable bit 306 may be used to enable or disable encryption and/or decryption of data associated with the encryption context. For example, enable bit 306 may be set to enable encryption of the blocks and cleared to disable encryption of the blocks.

The second data word (e.g., "DW1") may contain a block count 308 indicating the number of blocks to be encrypted using the encryption context. Block count 308 may be used by a DMA engine (e.g., DMA engine 204 of FIG. 2) to determine how much data will need to be fetched from an initial vector table. In addition, an initial vector table address 310 and an initial vector table address upper 312 in the third and fourth data words (e.g., "DW2" and "DW3") may specify a 64-bit address for the initial vector table.

Finally, the remainder of the encryption context (e.g., "DW4" through "DW15") may include two 128-bit keys 314-316 and one 128-bit initial vector 318 for use in AES-XTS encryption of the data. As a result, the encryption context may be structured such that for an I/O with a size of 4 KB, only a fetch of the encryption context from the encryption context table is necessary, and a separate fetch of the initial vector table using initial vector table address 310 and initial vector table address upper 312 is not required.

Figure 4:
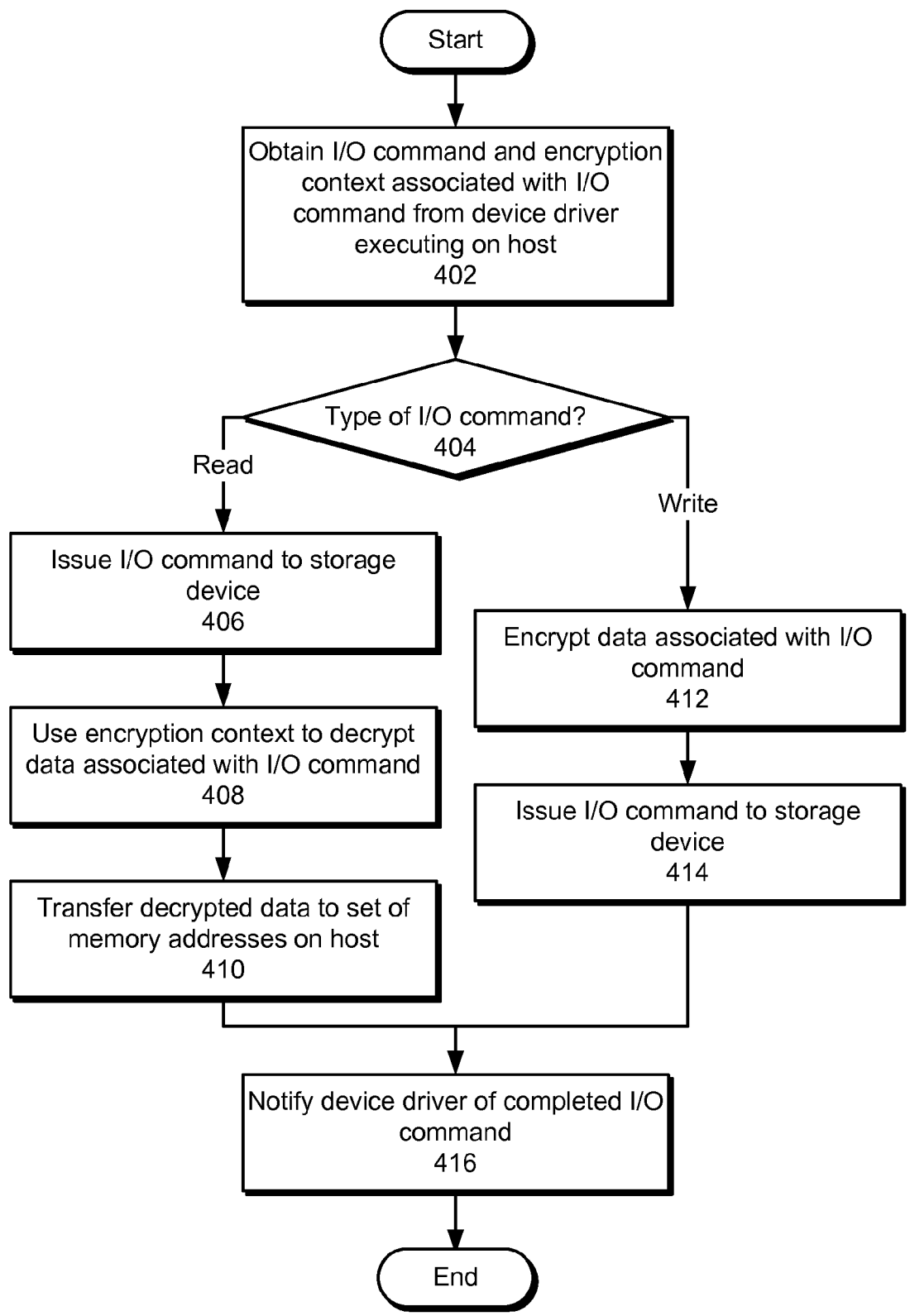
FIG. 4 shows a flowchart illustrating the process of securing data transfer between a storage device and a host in accordance with the disclosed embodiments.

FIG. 4 shows a flowchart illustrating the process of securing data transfer between a storage device and a host in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, an I/O command and an encryption context associated with the I/O command are obtained from a device driver executing on the host (operation 402). To obtain the I/O command and encryption context, a set of memory addresses associated with the I/O command and encryption context may be obtained from the device driver. DMA may then be used to transfer the I/O command and encryption context from the memory addresses on the host to a buffer on a storage controller bus interface between the host and storage device.

The storage controller bus interface may process the I/O command by applying the encryption context to data associated with the I/O command and issuing the I/O command to the storage device for processing by the storage device. The encryption context may enable the transmission of an encrypted form of the data between the storage device and the host, thus protecting the confidentiality of the data. In addition, the storage controller bus interface may apply the encryption context to data associated with an application, a file, and/or a user. In other words, the encryption context may allow data in the host to be encrypted at different encryption granularities, thus providing more flexibility in securing data than conventional block-based encryption and decryption on storage devices.

Furthermore, the storage controller bus interface may process the I/O command based on the type of the I/O command (operation 404). If the I/O command corresponds to a read command, the storage controller bus interface may issue the I/O command to the storage device (operation 406), then use the encryption context to decrypt the data (operation 408) after the data is retrieved from the storage device. Once the data is decrypted, the storage controller bus interface may transfer the decrypted data to a set of memory address on the host (operation 410) for use by the host. If the I/O command corresponds to a write command, the storage controller bus interface may encrypt the data (operation 412) to be written before issuing the I/O command to the storage device (operation 414). Finally, after the I/O command is completed by the storage device and/or the storage controller bus interface, the device driver is notified of the completed I/O command (operation 416).

Figure 5:
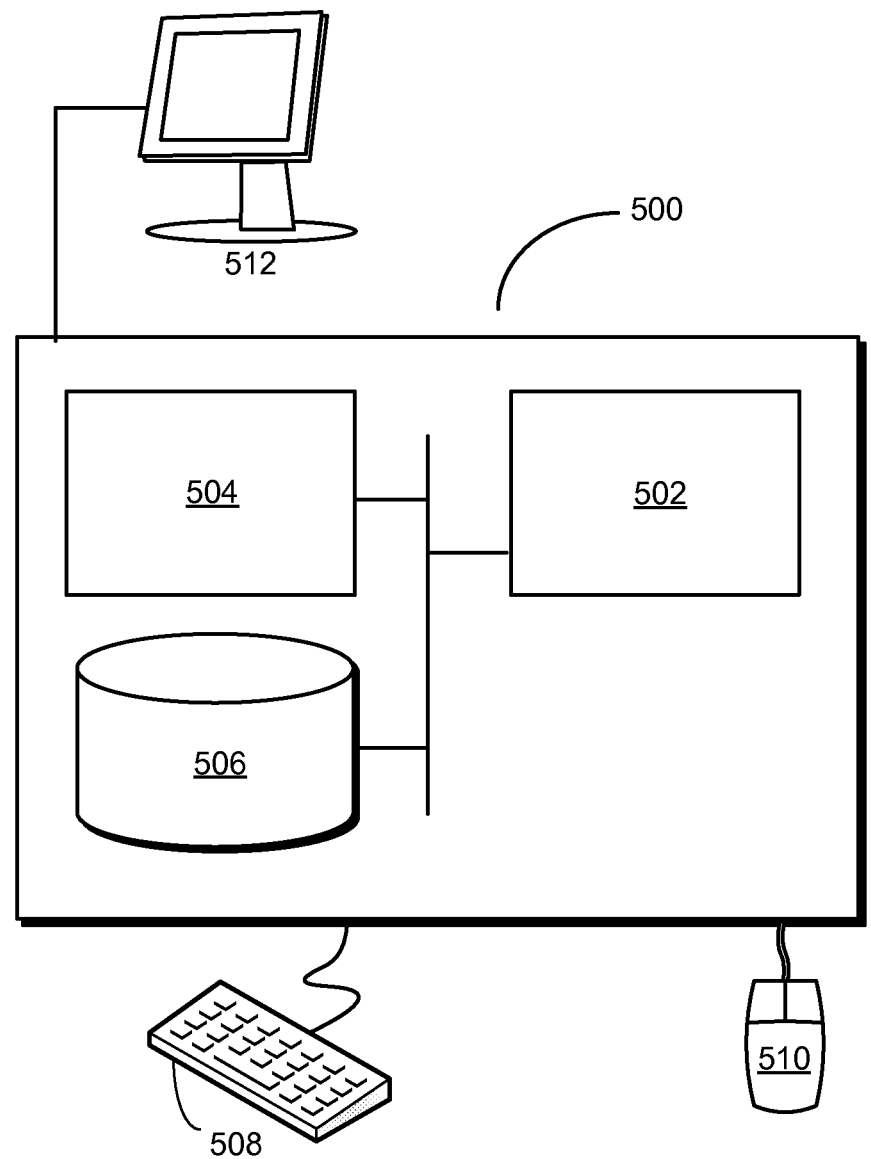
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for securing data transfer between a storage device (e.g., storage 506) and a host. The system may include a device driver and a storage controller bus interface between the host and the storage device. The device driver may execute on the host and provide an input/output (I/O) command and an encryption context associated with the I/O command to the storage controller bus interface. The storage controller bus interface may apply the encryption context to data associated with the I/O command to enable transmission of an encrypted form of the data between the storage device and the host. The storage controller bus interface may also issue the I/O command to the storage device for processing of the I/O command by the storage device. Finally, the system may also include a filesystem that creates and manages the encryption context during use of the storage device by the host.

In addition, one or more components of computer system 500 may be remotely located and connected to the other components over a network. Portions of the present embodiments (e.g., device driver, storage controller bus interface, filesystem, storage device, etc.) may also be located on different nodes of a distributed system that implements the embodiments. For example, the present embodiments may be implemented using a cloud computing system that transfers data between a remote storage device and a host.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for securing data transfer between a storage device and a host, the method comprising:
   obtaining a set of memory addresses associated with an input/output (I/O) command and an encryption context associated with the I/O command from a device driver executing on the host;
   using direct memory access (DMA) to transfer the I/O command and the encryption context from the set of memory addresses to a buffer on a storage controller bus interface between the host and the storage device;
   applying the encryption context to data associated with the I/O command using the storage controller bus interface, the encryption context to enable transmission of an encrypted form of the data between the storage device and the host; and
   issuing the I/O command to the storage device for processing.

2. The method of claim 1, further comprising:
   after the I/O command is completed by the storage device, notifying the device driver of the completed I/O command.

3. The method of claim 1, wherein using the DMA comprises using a DMA engine to transfer to or from the memory addresses on the host without directly accessing a central processor of the host.

4. The method of claim 1, wherein applying the encryption context to the data associated with the I/O command comprises:
   using the encryption context to encrypt the data prior to issuing the I/O command to the storage device when the I/O command corresponds to a write command; and using the encryption context to decrypt the data after the I/O command is processed by the storage device when the I/O command corresponds to a read command.

5. The method of claim 4, wherein if the I/O command corresponds to the read command, the method further comprises:
transferring the decrypted data to a set of memory addresses on the host.

6. The method of claim 1, wherein the encryption context is associated with at least one of an application, a file, and a user.

7. The method of claim 1, wherein the encryption context comprises:
one or more keys; and
an initial vector.

8. A system for securing data transfer between a storage device and a host, the system comprising:
a storage controller bus interface, to apply an encryption context to data associated with an input/output (I/O) command, the encryption context to enable transmission of an encrypted form of the data between the storage device and the host and to issue the I/O command to the storage device for processing; and
a device driver to execute on the host and to provide a set of memory addresses associated with the I/O command and the encryption context to the storage controller bus interface and to configure a direct memory access (DMA) transfer for the I/O command and the encryption context from the set of memory addresses to the storage controller bus interface.

9. The system of claim 8, further comprising:
a filesystem configured to create and manage the encryption context during use of the storage device by the host.

10. The system of claim 8, wherein after the I/O command is completed by the storage device, the storage controller is further configured to:
notify the device driver of the completed I/O command.

11. The system of claim 8, wherein the storage controller bus interface couples with a DMA engine to perform transfers to or from the host.

12. The system of claim 8, wherein applying the encryption context to the data associated with the I/O command comprises:
if the I/O command corresponds to a write command, using the encryption context to encrypt the data prior to issuing the I/O command to the storage device; and
if the I/O command corresponds to a read command, using the encryption context to decrypt the data after the I/O command is processed by the storage device.

13. The system of claim 12, wherein if the I/O command corresponds to the read command, the storage controller bus interface is further configured to:
transfer the decrypted data to a set of memory addresses on the host.

14. The system of claim 13, wherein the decrypted data is transferred to the set of memory addresses using DMA.

15. The system of claim 8, wherein the encryption context is associated with at least one of an application, a file, and a user.

16. The system of claim 8, wherein the encryption context comprises:
one or more keys; and
an initial vector.

17. A non-transitory computer-readable storage medium storing instructions that when executed by one or more processors cause the one or more processors to perform operations for securing data transfer between a storage device and a host, the operations comprising:
obtaining an input/output (I/O) command and an encryption context associated with the I/O command from a device driver executing on the host;
applying the encryption context to data associated with the I/O command using a storage controller bus interface, the encryption context to enable transmission of an encrypted form of the data between the storage device and the host;
encrypting the data using the storage controller bus interface prior to issuing the I/O command to the storage device when the I/O command corresponds to a write command; and
decrypting the data using the storage controller bus interface after the I/O command is processed by the storage device when the I/O command corresponds to a read command.

18. The computer-readable storage medium of claim 17, additionally including instructions to perform further operations comprising:
after the I/O command is completed by the storage device, notifying the device driver of the completed I/O command.

19. The computer-readable storage medium of claim 17, wherein obtaining the I/O command and the encryption context from the host comprises:
obtaining a set of memory addresses associated with the I/O command and the encryption context from the device driver; and
using direct memory access (DMA) to transfer the I/O command and the encryption context from the memory addresses on the host to a buffer on the storage controller bus interface.

20. The computer-readable storage medium of claim 19, wherein using the DMA comprises using a DMA engine to transfer to or from the memory addresses on the host without directly accessing a central processor of the host.

21. The computer-readable storage medium of claim 17, additionally including instructions to perform further operations comprising:
transferring the decrypted data to a set of memory addresses on the host when the I/O command corresponds to the read command.

22. The computer-readable storage medium of claim 17, wherein the encryption context is associated with at least one of an application, a file, and a user.

23. The computer-readable storage medium of claim 17, wherein the encryption context comprises:
one or more keys; and
an initial vector.

24. A method comprising:
obtaining an input/output (I/O) command and an encryption context associated with the I/O command from a device driver executing on a host, wherein obtaining the I/O command and the encryption context from the host includes transferring the I/O command and the encryption context from a set of memory addresses on the host to a buffer on a storage controller bus interface;
applying the encryption context to data associated with the I/O command using the storage controller bus interface, the encryption context to enable transmission of an encrypted form of the data between a storage device and the host;
encrypting the data using the storage controller bus interface prior to issuing the I/O command to the storage device; and decrypting the data using the storage controller bus interface after the I/O command is processed by the storage device.

25. The method of claim 24, wherein the transferring is performed using direct memory access (DMA).

* * * * *